United States Patent [19]
Chase

[11] 3,722,108
[45] Mar. 27, 1973

[54] INJECTION TRAINING AID

[75] Inventor: Myron C. Chase, Red Wing, Minn.

[73] Assignee: Weatherby/Nasco, Inc., Ft. Atkinson, Wis.

[22] Filed: Apr. 12, 1972

[21] Appl. No.: 243,352

Related U.S. Application Data

[63] Continuation of Ser. No. 74,763, Sept. 23, 1970, abandoned.

[52] U.S. Cl. ................................................35/17
[51] Int. Cl. ...........................................G09b 23/30
[58] Field of Search .................................35/17; 3/1

[56] References Cited

UNITED STATES PATENTS

| | | | |
|---|---|---|---|
| 2,686,374 | 8/1954 | Niiranen | 35/17 |
| 2,689,415 | 9/1954 | Haver | 35/17 |
| 2,704,897 | 3/1955 | Lade | 35/17 |
| 2,752,697 | 7/1956 | Lawall | 35/17 |
| 2,871,579 | 2/1959 | Niiranen et al. | 35/17 |
| 2,871,584 | 2/1959 | Poole | 35/17 |
| 2,945,304 | 7/1960 | Niiranen et al. | 35/17 |
| 2,995,832 | 8/1961 | Alderson | 35/17 |
| 3,339,290 | 9/1967 | Doyle | 35/17 |
| 3,512,183 | 5/1970 | Sharp | 3/1 |
| 3,520,071 | 7/1970 | Abrahamson et al. | 35/17 |

OTHER PUBLICATIONS

Merck Sharpe & Dohme Extract, Vol. XX, July 1966, No. 6, page 12 only, Pub. at West Point, Pa.

Primary Examiner—Harland S. Skogquist
Attorney—Howard T. Markey et al.

[57] ABSTRACT

A training aid for use in the medical arts and simulating at least a portion of a human body. The training aid includes a skin-simulating substance enclosing a flesh-simulating substance to form a replica of an extremity of a human body such as an arm. A bone-simulating substance is embedded in the flesh-simulating substance. Flexible tubes are embedded in the flesh-simulating substance to simulate arteries and veins. Fluid-receiving and retaining buttonlike members are placed immediately under the skin-simulating substance for use in teaching allergy testing.

2 Claims, 3 Drawing Figures

PATENTED MAR 27 1973 3,722,108

INJECTION TRAINING AID

SUMMARY OF THE INVENTION

This is a continuation of copending application, Ser. No. 74,763, filed Sept. 23, 1970 now abandoned.

This invention is concerned with a training aid which may be used in the training of medical personnel.

An object of this invention is a training aid which realistically simulates at least a portion of a human body, in appearance, structure and to the touch.

Another object is a training aid which may be used to train medical personnel to properly administer injections to a human being.

Another object is a training aid which may be used to train medical personnel to properly administer and observe allergy injections.

Other objects may be found in the following specification, claims and drawings.

BRIEF DESCRIPTION OF THE DISCLOSURE

The invention is illustrated more or less diagrammatically in the following drawings wherein.

DESCRIPTION OF THE PREFERRED EMBODIMENT

Figure 1:
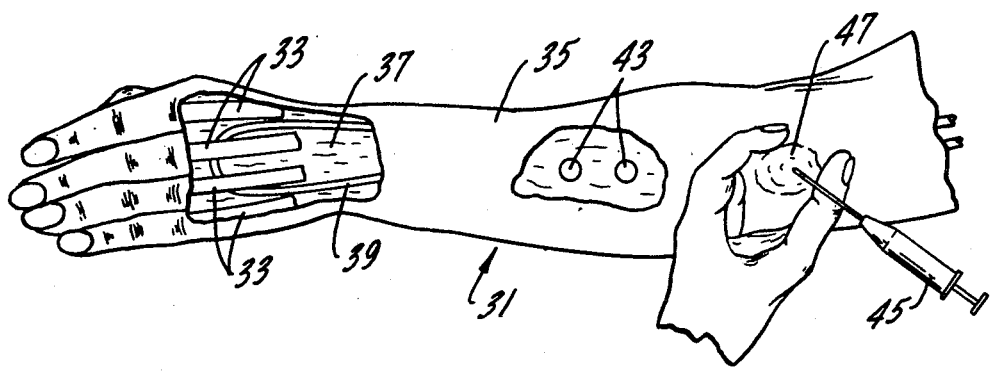
FIG. 1 is a partial view of a replica of a human arm and hand with portions cut away and showing a fluid being injected to simulate an allergy test.

FIG. 1 shows a form of hand 31 in which bone-simulating members 33 are positioned between the skin-simulating substance 35 and the flesh-simulating substance 37. Members 33 may also be partially or entirely embedded in substance 37. The looped, vein-simulating tube 39, which runs along the dorsal region of the hand, is located between the bone-simulating members 33 in the hand portion of the arm.

Figure 2:
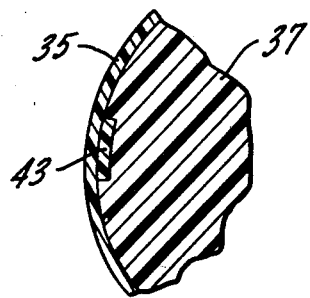
FIG. 2 is a partial cross-sectional view of an allergy test portion of the arm of FIG. 1.

Blister buttons or discs 43 are embedded in the arm beneath the skin 35 as shown in the cut away portion in FIG. 1. These buttons or discs are formed from a material such as polyvinyl chloride in which the amount of plasticizer is controlled so that the buttons are soft, porous and flexible and can absorb and retain a fluid such as air or liquid. Of course, it should be understood that other suitable materials may be used for this purpose and the application should not be limited to buttons formed of polyvinyl chloride. The manner in which the blister buttons or discs are positioned against the underside of the skin-simulating portion 35 is shown most clearly in FIG. 2. With fluid injected a "-swelling" of the skin layer occurs which duplicates an allergy symptom. The buttons may be formed much larger and placed anywhere in the arm or hand to demonstrate the greater swelling resulting from snakebite.

The arm of the invention so closely simulates a human arm as to provide substantially as realistic training as may be accomplished with human arms. Thus the skin texture, appearance, color and weight of the arm are controlled to equate the same as nearly as possible to that of a human arm. The same is true of any human part, such as a leg, foot, torso, neck, head or the like.

A mold is formed of rubberlike plastic material, such as silicone rubber, using as a base the appropriate human part from a living individual or from a cadaver. The skin layer is then molded within such mold. Bone, flesh, artery and vein-simulating elements, as above described, are then appropriately placed on or within the skin layer and mold, as are buttons 43.

As is known in the plastic art, the flexibility, consistency, weight and gelatinlike nature of the elements of the arm of the invention are controllable by varying the amount of plasticizer and temperatures to which the material, such as polyvinyl chloride, is subjected.

The training aid of the invention provides a greater flexibility and rapidity of training than that achievable in the past. Nurses, for example, have been taught injection and fluid withdrawal through the use of oranges and grapefruit. Training on a living individual can subject the patient to unnecessary discomfort and possible pain. Training on cadavers is limited, expensive and unrealistic. With the device of the invention the teacher may establish, for example, a predetermined pulse beat by manipulation of a syringe (not shown) with an open end of tube 39 closed. The student will take the pulse, at the wrist, for example, of the arm of FIG. 1 and report his findings. The teacher may then compare such report with the predetermined pulse, may vary the pulse and repeat the teaching step and the like. Similarly, the student is assured an opportunity to observe the effect of allergy and snakebite with the arm of the invention. Regarding snakebite, a larger piece of fluid-absorbing material, such as that of buttons 43, located just beneath the skin layer on the arm or in the thumb, for example, may have an embedded tube (not shown) similar to the tube 39 communicating therewith, through which air or liquid may be supplied to demonstrate swelling over variable time increments.

The use, operation and function of this invention are as follows:

The training aid of the invention is a human part replica used to teach and enable persons in the medical arts to practice the art and techniques of administering injections, allergy testing and allergy and snakebite recognition.

Injections can be administered in designed portions of the arm, such as the blister buttons or discs 43 which are made of fluid-retaining polyvinyl chloride.

Figure 3:
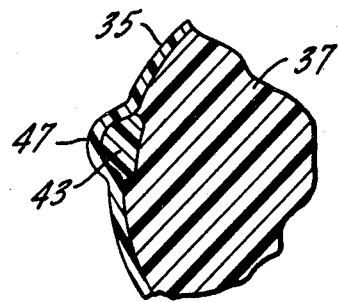
FIG. 3 is a cross-sectional view similar to FIG. 2.

The blister discs or buttons 43 are located against the underside of the nonporous skin-simulating material 35 and are otherwise substantially surrounded by the nonporous flesh-simulating material 37. The student locates the blister disc or button by pinching the skin, as is customary in administering such a test. When the student has located the blister disc, a hypodermic syringe 45 may be used to inject a fluid such as air or a liquid into the blister disc in the manner shown in FIG. 1. The blister disc absorbs the fluid and expands. Its inward expansion is prevented by the heavier flesh-simulating substance and the skin layer is thus forced outwardly in the manner shown in FIG. 3 to form a "-blister" or bump 47 on the skin, thereby simulating the allergy reaction. The fluid may be removed from the blister member, in preparation for reuse, by inserting the syringe 45 needle and drawing a vacuum within the syringe 45, the parts returning to the configuration shown in FIG. 2.

A syringe may also be connected to one end of the tube 39. The open end of the tube may be squeezed closed and a pulse rate may be established by squeezing the syringe and forcing air into the tube 39. The student finds the tube with his fingertips by feeling along the skin 35.

The embodiments of the invention in which an exclusive property or privilege is claimed are defined as follows:

1. In a training aid for use in relation to allergy-test injections, an anatomical part having an internal flesh-simulating portion, a skin-simulating outer layer overlying and in contact with said internal portion, said outer layer having a greater flexibility than said internal portion and at least one blister-simulating element normally substantially embedded in said internal portion and having its outer surface underlying and in contact with the undersurface of said outer layer, said internal portion and outer layer being formed of nonporous, nonfluid-receptive material, said element being formed of fluid-receptive and retaining material, said material of said element being expandable in response to injection of fluid into said element, said greater flexibility of said outer layer in relation to said internal portion causing expansion of said element to be directed outwardly to distort said outer layer in the manner of an allergy reaction blister.

2. The structure of claim 1 wherein said outer layer and element are formed of a material having a return characteristic whereby withdrawal of fluid from said element produces an automatic return of said outer layer to its original nondistorted configuration and the return of said element to its normal substantially embedded position.

* * * * *